United States Patent [19]
Hakim

[11] 4,143,452
[45] Mar. 13, 1979

[54] PACIFIER METHOD OF CONSTRUCTION

[76] Inventor: Louise Z. Hakim, 126 Sabine, Monroe, La. 71201

[21] Appl. No.: 876,288

[22] Filed: Feb. 8, 1978

[51] Int. Cl.² .................... B23P 19/00; B29C 19/00; B32B 31/00

[52] U.S. Cl. .................... 29/434; 29/453; 128/360; 156/245; 156/293; 264/263; 264/275; 264/299

[58] Field of Search .................... 29/453, 434; 156/245, 156/293; 128/360; 264/263, 275, 299

[56] References Cited

U.S. PATENT DOCUMENTS

| | | | |
|---|---|---|---|
| 526,932 | 10/1894 | Metzger | 128/360 |
| 2,222,755 | 11/1940 | Watson | 264/275 X |
| 2,462,786 | 2/1949 | Steckler | 128/360 |
| 2,529,863 | 11/1950 | Bowen | 156/293 X |
| 2,888,929 | 6/1959 | Bray | 128/360 |
| 3,100,641 | 8/1963 | Nicholls | 264/275 X |
| 3,352,958 | 11/1967 | Andrews | 264/275 X |
| 3,455,292 | 7/1969 | Mudrinich | 128/360 X |
| 3,825,014 | 7/1974 | Wraten | 128/360 |

FOREIGN PATENT DOCUMENTS

| | | | |
|---|---|---|---|
| 938525 | 12/1973 | Canada | 128/360 |
| 1361655 | 7/1974 | United Kingdom | 128/360 |

*Primary Examiner*—Charlie T. Moon
*Attorney, Agent, or Firm*—Sughrue, Rothwell, Mion, Zinn and Macpeak

[57] ABSTRACT

A method of construction and resulting unitary latex pacifier is disclosed. The pacifier is constructed with the nipple section prefabricated as one unit and placed on a central post of a shield mold. Latex is poured around the nipple to form the shield and nipple as a single piece. While the latex is curing, it is removed from the mold, and the handle portion of the pacifier is dipped in liquid latex and inserted in the bottom of the shield to form a unitary construction. The handle section has been previously fashioned in a mold itself. Alternatively, an encircling ring which is used as reinforcement can be placed on the post followed by the nipple with the shield latex poured over that unit. Under pressure, the handle is then forced into the nipple before curing takes place. The resulting pacifier exhibits one-piece construction which will not separate or disintegrate into component parts which may be ingested by an infant. Various shield shapes may be utilized, including a tapered shield or a reinforced edge portion. The shield also has a series of holes in it.

10 Claims, 12 Drawing Figures

PACIFIER METHOD OF CONSTRUCTION

BACKGROUND OF THE INVENTION

This invention relates to pacifiers used by infants and to a method of manufacture of the article.

Within the prior art, a number of pacifier-like devices are known. These nipple-like devices have been used for many years to allow infants to suck, teeth and the like or otherwise satisfy their oral requirements. A host of different designs and configurations are known, typified by U.S. Pat. Nos. 722,350, 2,462,786, 3,267,937, 3,669,112 and 3,825,014. Devices of this type are subject to manufacture in very large numbers, and given general price competition for baby toys and the like, economies of manufacture on an individual basis translate to large advantages in the marketplace.

Moreover, in recent years, various governmental agencies have set forth regulations and criteria governing the specifications for baby and children's toys. Paramount in this regulatory process is the requirement that such toys be made in such a fashion that when in use, they will not dissassemble or otherwise break such that small component parts could be ingested or have sharp protruding edges. Hence, agencies such as the U.S. Consumer Products Safety Commission have set forth standards which require that certain types of toys obtain their approval prior to marketing. Those standards generally reflect the need for increased safety of a particular unit to insure that under normal or even abnormal modes of operation, the toy will be safe.

The criteria for safety in toys is particularly stringent with respect to those devices used by infants. Because infants have a tendency to indiscriminately use and destroy their toys, such items must be built with an exceptionally rugged mode of construction. Moreover, because infants have a strong tendency to place objects in their mouths, toys adapted for infant use must be devoid of any sharp edges or, just as importantly, tendencies to break down into small components which could be swallowed by such infants.

Hence, although a variety of pacifiers are known, research still continues to improve this widely-used infant toy to provide more satisfactory results in terms of economy of manufacture and safety while in use. Various prior art devices, while showing various pacifier designs, are not satisfactory when measured against current criteria for safety and ease of manufacture. Typical is U.S. Pat. No. 3,669, 112 which shows the construction of a one-piece pacifier nipple, shield and adapter piece. While those items are shown in the patent as being molded as a unitary item, the ring or holder must be separately attached and affixed to the pacifier nipple. Hence, in actual production, the resulting pacifier contains at least two discrete components which are susceptible to separation and giving rise to the attendant risks of injury by the user. A host of prior art devices exhibit this tendency, which has now been deemed to be unsatisfactory for current use.

A second type of pacifiers typified by U.S. Pat. No. 3,825,014 which constitutes a one-piece injected molded device made of a flexible plastic material, while injection molding is a common form of manufacture, holes or other complex three-dimensional shapes are not readily manufactured. Also, in injection molding, the choice of materials is generally limited to plastics materials which are susceptible to break down, discoloration and the like. Clearly, for infant use, the preferred choice of materials is a latex rubber type of device which is soft and pliable as opposed to a flexible plastic which, under some conditions, may be susceptible to cracking or breaking. Also, in the case of injection molding, economies of manufacture are not readily obtainable in view of the waste normally associated with that type of manufacture.

SUMMARY OF THE INVENTION

This present invention overcomes the deficiencies of the prior art by utilizing latex as the material of choice in the fabrication of pacifiers. By use of novel molding techniques, the resulting product is of unitary construction such that the nipple cannot be pulled away from the shield and the handle cannot be pulled away from either the nipple or the shield. By separately molding the shield, various types of constructional techniques may be used. For example, the shield may have a lip of increased thickness for structural rigidity or may be slightly tapered. Holes may also be placed in the shield at appropriate locations for safety purposes.

In one embodiment of the invention, the hollow nipple is molded separately of latex and placed over a post in the shield mold. Latex is then poured into the shield mold, solidifying around the nipple base to create a unitary structure. While the latex is curing, generally while being heated, it is removed from the mold and the handle inserted into the opening with a supply of liquid placed over the exposed end. With the unit curing, a unitary construction is achieved of a one-piece latex nipple, shield and handle forming a unitary pacifier configuration.

In a second embodiment, a reinforcing ring is placed about the base of the post and the nipple inserted over the post. Latex is poured in a manner similar to the first embodiment, and the unit is removed from the mold while still curing. The handle assembly, utilizing a hard plastic reinforcing element, is then forced into the nipple above the reinforcement and is cured into place by the hardened latex.

Accordingly, it is an object of this invention to define a method of manufacture of a one-piece pacifier utilizing a latex type of material.

It is another object of this invention to define a method of manufacture of latex pacifiers utilizing reinforcing elements which are integrally molded into the construction.

Yet another object of this invention is to define a novel pacifier having a shield configuration which is tapered to a progressively thinner shape from the nipple section.

Still another object of this invention is to define a novel latex pacifier having a shield configuration with a raised lip portion for increased strength.

DESCRIPTION OF THE PREFERRED EMBODIMENTS

Referring now to FIGS. 1-4, a first preferred embodiment of the method of manufacturing a unitary construction latex pacifier is shown. In this embodiment, a reinforcing ring is utilized to anchor the handle to the shield. As a precursor to the molding operation shown in FIG. 1, the nipple 10 is separately molded on a mold not shown to a configuration generally shown in FIG. 1. While the nipple shape shown is generally favored, in some situations, elongated nipples of greater length or of tips having greater width are utilized. Alternatively, prior to insertion of the nipple 10 onto the mold 12, a hollow longitudinal plastic insert may be used to provide additional directional stabilization for the nipple. Such hollow tubular elements may be placed inside the nipple cavity 14 prior to insertion on the mold 12.

Figure 1:
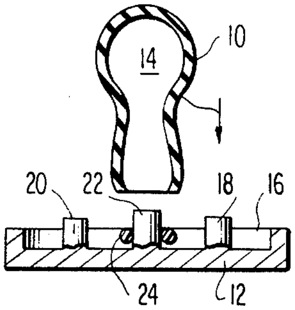
FIGS. 1–4 schematically show a method of fabricating a pacifier according to a first embodiment of this invention.

As shown in FIG. 1, the shield mold 12 is generally of circular cross-section having a shallow portion 16 dimensioned to duplicate the cross-sectional area of the completed shield. A plurality of posts 18-20 are provided such that the molded article will have holes passing through it which provide for safety features if the entire shield is inhaled by a small baby. The holes will provide air passages should the entire device be swallowed. The posts 18-20 are disposed in a uniform pattern about the mold 12, and, although two such posts are shown, it is readily apparent that the shield may have any number of holes through it by means of posts exposed in a regular pattern about the mold.

As shown in FIG. 1, the mold 12 has a central post element 22 upon which the nipple element 10 is placed. Prior to insertion of the nipple element 10 over the post 22, a reinforcing ring 24 of hard plastic or rubber is placed about the post 22. With the reinforcing ring 24 in place, the nipple is lowered over the post 22 in a manner shown by the arrow in FIG. 1.

Figure 2:
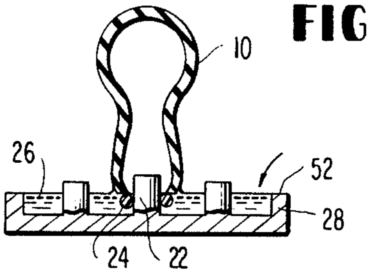
Figure 3:
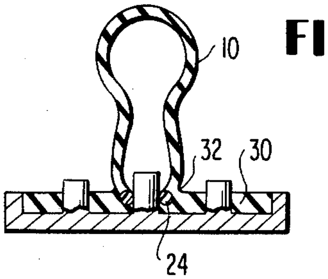

Referring now to FIGS. 2 and 3, the nipple 10 is shown in place over the post 22 with the reinforcing ring 24 in position. With this order of elements in position, liquid latex 26 is placed in the mold up to the lip section 28. The latex is allowed to cure as shown in FIG. 3 such that the ring 24 is sealed within the nipple 10 in the newly-formed shield 30. Integral construction is formed having a fillet section 32 between the nipple 10 and the shield 30, thereby encapsulating the ring 24.

Figure 4:
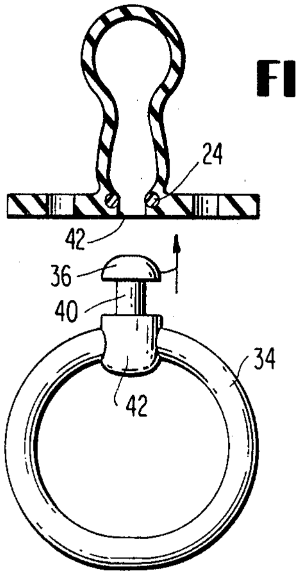

Referring now to FIG. 4, while the integral nipple, shield and ring section are still curing—that is, before the latex has sufficiently solidified—ring section 34 is introduced. The completed subassembly, constituting the nipple and integrally-molded shield, is removed from the mold 12, and the ring section having a solid plastic member of enlarged cross-section 36 coupled to post 40 is forced into hole 42. A supply of liquid latex may be introduced in the vicinity of the enlarged portion 36 and post 40 to provide additional sealing contact. Elements 36 and 40 are generally fashioned from a rigid plastic material.

Figure 5:
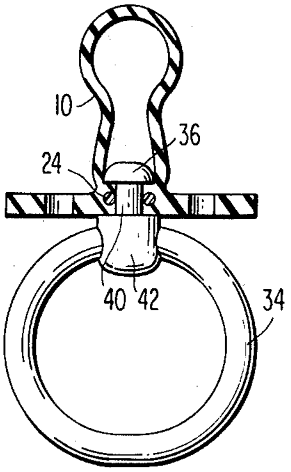
FIG. 5 shows a completed pacifier made in accordance with the method shown in FIGS. 1–4.

As shown in FIG. 4, the handle 34, typically made of latex, is rigidly attached to the matching section by means of an adapter 42. As shown by the arrow in FIG. 4, the enlarged section 36 is forced into hole 42 above the encapsulated ring 24. As shown in FIG. 5, the complete assembly is now allowed to cure. The nipple portion 10 is formed integrally with the shield 30 and ring section 24 firmly encapsulated therebetween. the shield 30 has a series of holes 44 which are used for safety precautions. Specifically, if the pacifier is inhaled by an infant, holes 44 in the shield 30 provide air passages such that the infant will not suffocate. The enlarged section 36 is sealingly placed inside the nipple 10, and the hole 42 is completely surrounded by latex material. As the unit cures, the ring 24 will solidify about the neck portion 40 to affirmatively preclude the enlarged section 36 from ever dislodging from the shield.

Also, as shown in FIG. 5, the top portion of adapter 42 lies flush at the bottom portion of the shield 30. While FIG. 5 is not shown to scale, a typical dimensioning of the pacifier shown would have a shield of diameter approximately 50 mm, generally in the range of 46-54 mm in diameter. While two holes 44 are shown, any number up to six can reasonably be accommodated. The holes are generally less than 5 mm in diameter and are generally placed approximately 5 mm from the edge or outer periphery of the shield 30. The shield is typically molded to a thickness of approximately 3-6 mm.

Figure 6:
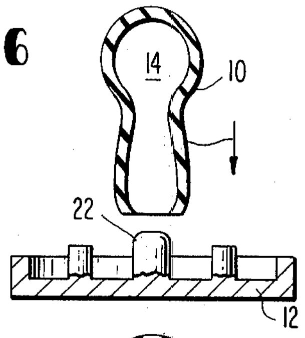
FIGS. 6–9 show the steps in a method of construction of a pacifier in accordance with a second preferred method of manufacture.
Figure 7:
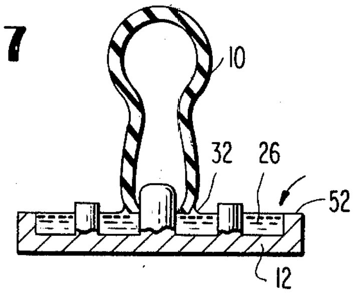
Figure 8:
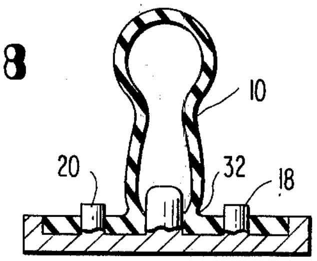

Referring now to FIGS. 6-9, a second preferred embodiment of this invention is shown. The method of constructing the second preferred embodiment of this invention is identical to that shown in FIGS. 1-4, with the exception that the retaining ring 24 is eliminated. As shown in FIG. 6, the nipple element 10 is placed over the mold 12 having a post 22 for molding the shield to the nipple. Although not shown, in cavity 14, an elongated hollow insert may be used to provide directional stiffening for the nipple. As shown in FIG. 7, liquid latex 26 is poured into the mold 12 to the lip 28. The liquid latex then solidifies around the nipple wall 10 to form a fillet area 32. The completed assembly in the mold is shown in FIG. 8.

Figure 9:
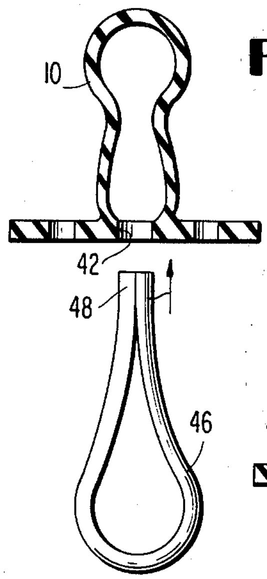

As shown in FIG. 9, the completed assembly containing the nipple integrally molded to the shield is removed from the mold before the latex cures. A handle section 46, previously molded of latex rubber in a teardrop configuration, is used in place of the handle portion 34 shown in FIG. 4. The handle section 46 has its end portion 48 dipped in liquid latex and inserted upward through the hole 42 in a manner shown by the arrow in FIG. 9. It is apparent that other configurations for the handle may be used, although the shape shown in FIG. 9 together with a ring are most common.

Figure 10:
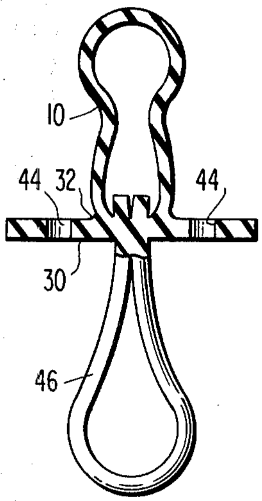
FIG. 10 shows a second preferred embodiment of a pacifier constructed in accordance with the method steps shown in FIGS. 6–9.

As shown in FIG. 10, the assembly is allowed to cure such that the end 48 becomes a unitary part of the construction within the shield 30 and fillet section 32 about the nipple wall 10. Hence, an all latex pacifier is formed having a unitary construction such that the handle 46 cannot be physically removed from the nipple since it is now an integral unit. Also, in a manner consistent with the prior preferred embodiment, holes 44 defining air passages through the shield may be placed in a convenient manner depending on the position of posts 18-20. As in the prior preferred embodiment, any number of holes may be utilized depending on the arrangement of posts within the mold 12.

Figure 11:
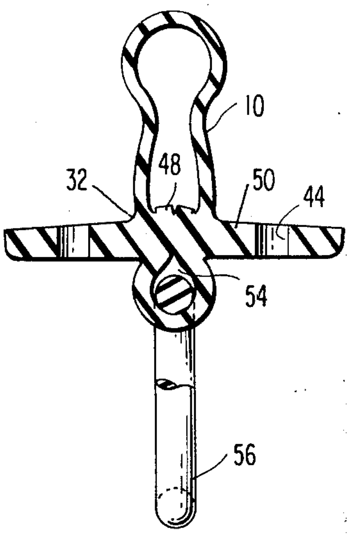
FIG. 11 is a side view of a third preferred embodiment of a pacifier constructed in accordance with the method shown in FIGS. 6-9 having a thickened, tapered shield.

Referring now to FIG. 11, a third preferred embodiment of the novel pacifier is shown in perspective format. The pacifier made in accordance with the FIG. 11 embodiment is similar to that shown in FIG. 10, with two salient exceptions. First, the shield 30, rather than being of uniform cross-section, is tapered having a thickened portion 50 adjacent to the nipple with a progressively decreasing outward taper. Also, the shield as molded is of a thicker cross-section than that shown in either FIGS. 5 or 10. This increased thickness of the shield is accomplished by increasing the height of the end wall 52 of the mold 12 while tapering the base of the mold. j Additionally, apart from the differences in shield construction, the pacifier of FIG. 11 has a different handle construction. Rather than use the handle 46 as shown in FIG. 10, the pacifier of FIG. 11 utilizes the same handle element 46 with the operative length materially shorter. Hence, the end sections 48 are inserted into the opening 42 such that a small ring-like opening 54 exists about which a flexible latex ring or handle has been previously inserted. Hence, by this construction, the flexible latex ring handle is allowed to rotate within the hole 54.

As can readily be appreciated, an all latex pacifier is the result having a thickened or toughened shield element such that protracted biting or the like will not destroy that member. Also, as shown conventionally, holes that are placed through the shield element are used.

Figure 12:
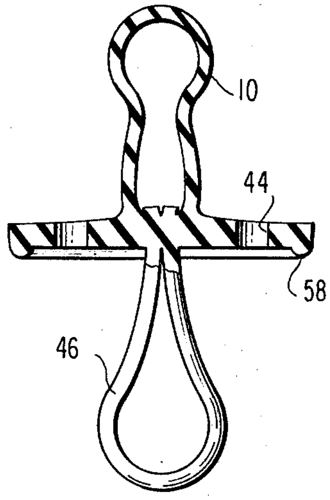
FIG. 12 is a fourth preferred embodiment of a pacifier constructed in accordance with the method shown in FIGS. 6-9 having a shield with an outer thickened lip portion.

Referring now to FIG. 12, a fourth preferred embodiment of a novel one-piece all latex pacifier is shown. This embodiment is similar to that shown in FIG. 10, with the exception that the shield element 30 is of thickened construction in the manner shown in FIG. 11 but additionally has a lip element 58 disposed about the periphery. Typically, if the shield is 4 mm in thickness, the lip element may be an additional millimeter, giving the outer periphery a total thickness of 5 mm. This increased strength on the shield allows sufficient strength to insure that the shield will withstand nawing or biting or other generally destructive use. Also, it becomes nearly impossible for an infant to swallow.

As can readily be appreciated, by the novel methods of manufacture, various configurations of all latex one-piece pacifiers can be manufactured. Various modifications can be made to the method of manufacture to produce the same articles without departing from the essential novel features of this invention.

I claim:

1. A method of making a pacifier having a hollow nipple, a shield and a handle as a unitary item comprising the steps of:

placing a premolded latex-type nipple on a central post component of a mold for the shield such that an opening will remain into said nipple after molding;

pouring a latex-type material into said mold to integrally-mold said nipple and shield together;

removing said nipple and shield from said mold before the latex-type material has cured; and placing a quantity of latex-type material on a component portion of said handle and inserting said component portion into the hole, whereby, upon curing of said latex material, said nipple, shield and handle are molded as a unitary item inseparable in actual use.

2. The method of claim 1 further comprising the step of providing additional post components in a pattern about said central post component in said mold to provide holes in said shield when molded.

3. The method of claim 2 wherein said handle in premolded form a latex-type material in an elongated tear-drop configuration, and said component portion comprises a narrow apex of said configuration for insertion into said hole.

4. The method of claim 3 further comprising the step of inserting a flexible ring member into said handle prior to insertion into said hole.

5. The method of claim 4 further including the step of molding said shield to have a taper of decreasing thickness from said nipple to the edge of said shield.

6. The method of claim 2 further including the step of molding said shield to have a ridge of increased thickness at its outer edge.

7. The method of claim 2 further including the step of molding said shield to have a taper of decreasing thickness from said nipple to the edge of said shield.

8. The method of claim 2 further comprising the step of disposing on said central post component a reinforcing ring prior to placement of said premolded nipple, and wherein said component portion of said handle has an enlarged head section with a neck portion for engagement of said reinforcing ring at said neck portion and providing sealing engagement of said heat section when it is inserted in said opening beyond said reinforcing ring.

9. The method of claim 8 wherein said enlarged head section is inserted into said opening prior to the curing of said latex shield.

10. The method of claim 8 wherein said reinforcing ring is encapsulated in said shield about said opening upon curing of said latex.

* * * * *